US007053013B1

(12) United States Patent
Nosov et al.

(10) Patent No.: US 7,053,013 B1
(45) Date of Patent: May 30, 2006

(54) X-RAY ABSORBING MATERIAL AND VARIANTS

(76) Inventors: Igor Stepanovitch Nosov, Kv. 20, d. 43, ul. Sverdlova, Balashiha, Moskovskaya obl., 143900 (RU); Vladimir Ivanovich Tkatchenko, Kv. 20 d. 4, pr. K. Marksa, Dnepropetrovsk, 320095 (UA); Valeriy Anatolievich Ivanov, Kv. 29, d. 13/15, pr. K. Marksa, Dnepropetrovsk, 320095 (UA); Valeriy Ivanovich Petchenkin, Kv. 181,d. 80, shosse Zaporozchsky, Dnepropetrovsk, 320041 (UA); Stanislav Yurivich Sokolov, Kv. 62, d. 47, ul. Yuglas, Riga 1007 (LU)

( * ) Notice: Subject to any disclaimer, the term of this patent is extended or adjusted under 35 U.S.C. 154(b) by 0 days.

(21) Appl. No.: 09/509,256

(22) PCT Filed: Sep. 24, 1998

(86) PCT No.: PCT/RU98/00301

§ 371 (c)(1),
(2), (4) Date: Mar. 22, 2000

(87) PCT Pub. No.: WO99/17303

PCT Pub. Date: Apr. 8, 1999

(30) Foreign Application Priority Data

Sep. 30, 1997 (RU) ................................. 97116386

(51) Int. Cl.
*B32B 27/04* (2006.01)

(52) U.S. Cl. ...................... 442/180; 442/228; 442/237; 442/301; 442/316; 442/376; 442/380; 442/417; 442/133; 442/131; 442/172; 442/178

(58) Field of Classification Search ................ 252/911; 442/180, 228, 237, 301, 316, 376, 380, 417, 442/131, 133, 172, 178
See application file for complete search history.

(56) References Cited

U.S. PATENT DOCUMENTS

| | | | | | |
|---|---|---|---|---|---|
| 2,153,889 | A | | 4/1939 | Hames | |
| 3,194,239 | A | | 7/1965 | Sullivan | |
| 3,239,669 | A | * | 3/1966 | Weinberger | 250/108 |
| 4,129,524 | A | | 12/1978 | Nagai et al. | |
| 4,176,093 | A | | 11/1979 | Zoch | |
| 5,247,182 | A | * | 9/1993 | Servant et al. | 250/516.1 |
| 5,849,311 | A | * | 12/1998 | Sawan et al. | 242/406 |

FOREIGN PATENT DOCUMENTS

| | | | |
|---|---|---|---|
| GB | 1260342 | * | 1/1972 |
| RU | 2066491 | | 2/1994 |
| RU | 2063077 | | 5/1994 |

* cited by examiner

*Primary Examiner*—Glenn Caldarola
*Assistant Examiner*—Alexis Wachtel
(74) *Attorney, Agent, or Firm*—Myron Greenspan, Esq.; Lackenbach Siegel, LLP

(57) ABSTRACT

The present invention relates to an X-ray absorbing material that can be used in medicine as well as in the manufacture of special protective clothing, protective screens, housings, protective coatings and isolation materials. In a first embodiment, the material uses as a filler a poly-dispersed mixture, segregated by kneading and containing metallic particles having a size between $10^{-9}$ and $10^{-3}$ m, wherein the particles are bonded to the surface of a textile base. The density of the material is defined by the relation $q_N$=(0.01–0.020) $q_P$, where $q_N$ is filler. In a second embodiment, the invention uses as a filler the above mixture, although here the particles are surrounded by the volume of a matrix made of a compound that solidifies under atmospheric pressure. The total mass of the poly-dispersed and segregated mixture is defined by the relation M=(0.05–0.5)m, where M is the total mass of the X-ray absorbing poly-dispersed and segregated filler, while m is the equivalent mass of the filler material that is equal in protective properties to the mass M. In a third embodiment, the invention uses as a filler the above mixture with the particles bonded to an intermediate substrate consisting of a textile base and surrounded by the volume of a matrix.

6 Claims, No Drawings

X-RAY ABSORBING MATERIAL AND VARIANTS

The application claims priority from PCT/RU98/00301, filed Sep. 24, 1998 claiming priority from Russian Application No. 91116386, filed Sep. 30, 1997, and the contents of both references are herein incorporated by reference.

BACKGROUND OF THE INVENTION

1. Field of the Invention

The invention relates to X-ray contrasting and X-ray protection materials and can be used in the field of medicine, namely in Roentgen equipment intended for the diagnosis and management of various conditions. More specifically, it can be used for the monitoring of endo-prosthetic appliances, internal surgical joints and connections, and of post-surgical areas of the body in order to avoid leaving surgical napkins, tampons or surgical instructions inside the body of a patient. The invention can also be used to select areas to be exposed in the course of radiation therapy, etc., as well as to produce protective uniforms (aprons, smocks, waistcoats, caps, etc.) and protective shields, partitions, protective coatings, isolation materials, etc.

2. Description of the Prior Art

Already known is an X-ray absorbing material as disclosed in Swedish Patent No. 349366, which provides for an artificial rayon thread that contains barium sulfate ($BaSO_4$) as a mechanical impurity (15% through 65% of total mass). However, adding this mechanical impurity to the textile base of the material results in an abrupt reduction of the material's durability.

Also known are X-ray absorbing materials, for example, in the form of threads that contain bismuth oxide, colloidal silver, and iodine derivatives—all in the form of X-ray contrasting impurities added to a polymeric composition (see, for example, the X-ray absorbing materials described in the Abstract of A. V. Vitulsky entitled "Obtaining and researching of synthetic fibers with X-ray contrasting and anti-germ solutions being added at the time of preparation," Leningrad, 1974). However, an examination of the properties of a textile base containing such impurities reveals that because the homogeneity of the fiber structure is violated, which is caused by the negative influence of particles of contrasting impurity, the physical and mechanical properties of the fibers and threads made on the basis of such impurities are degraded. A textile base containing such impurities lacks durability, and this limits the range of applications this base can have.

Another known example of the prior art is the X-ray absorbing material disclosed in the Bulgarian Certificate of Invention No. 36217 (1980), made in the form of a thread containing a protective coating against X-rays produced from heavy metals that have been derived by means of crystallization from corresponding salt solutions. Unlike the materials mentioned above, this one displays better physical and mechanical properties because the derivation of the coating by crystallization of the heavy metals from solutions does not substantially affect the mechanical properties of the initial material. Nevertheless, the thinness of the coating causes a lessening of X-ray contrasting and X-ray protection properties. Furthermore, after washing, cleaning and so on, the X-ray absorbing coating adheres only weakly to the initial material, and this causes an abrupt reduction of the X-ray contrasting and X-ray protective properties.

Another known example of the prior art is the X-ray absorbing material disclosed in Soviet Certificate of Invention No. 1826173 A61$_B$17/56, 17/00, U.S.S.R., (1980), which has the merits of a material in the form of a thread containing the X-ray absorbing coating of heavy metals, but lacks its drawbacks. This is due to the fact that the X-ray absorbing coating is made of ultra-dispersible particles (UDPs) of sizes between $10^{-6}$ and $10^{-7}$ m and displays such properties as the abnormal weakening of radiation, as stated in "The phenomenon of abnormal reduction of X-radiation by an ultra-dispersible environment" (Diploma No. 4 of the Russian Academy of Natural Sciences, priority date—May 7, 1987). The metal-containing element (between $10^{-6}$ and $10^{-7}$ m in size), a finely dispersible mixture of this material, is bonded to the surface of the thread, i.e., on the surface of the textile base. However, the use of a finely dispersible mixture only in the range of ultra-dispersible particles (between $10^{-6}$ and $10^{-7}$ m in size) that are chemically and physically fissile and pyrophoric, combustible is technologically problematic because it requires special conditions of manufacture, transport, storage and technological application.

The recent discovery in the field of physics of the poly-dispersed environment, entitled "The phenomenon of the abnormal alteration by mono- and multiple environments of permeating radiation quantum stream intensity" (Diploma No. of the Russian Academy of Natural Sciences, priority date—Sep. 19, 1996) caused the discovery that the poly-dispersed environment, assuming that a certain level of dispersibility of particles and segregation thereof by intermixing is ensured, displays a capacity for an abnormally high reduction of X-ray radiation. This is caused by the fact that the poly-dispersed particles, having a size of between one thousandth and hundreds of micrometers, organize themselves into energetically interconnected X-ray absorbing groups. ("The segregation of poly-dispersed particles" means an irregular distribution of the poly-dispersed particles caused by the intermixing of the mixture that is due to the particles' self-organization into a system of energetically interconnected groups, ensuring an increase in photo-absorption.) It is generally known in modern engineering that the use of poly-dispersed mixtures that consist of particles having a size of between $10^{-9}$ through $10^{-3}$ m does not require any specific limitations and is not fraught with specific technological difficulties in manufacture, transport, storage and use.

U.S. Pat. No. 3,239,669 discloses an X-ray absorbing material containing a rubber matrix with a fixed X-ray absorbing filler. According to this patent, X-ray absorbing elements in the form of lead, bismuth, silver and tungsten can be used as a filler. The main drawback of this example of the prior art is that it reduces the solidity of the material by a factor of two to three times due to the fact that the absorbing particles of filler have a negative influence by violating the uniform structure of the original polymeric mass.

U.S. Pat. No. 2,153,889 discloses other X-ray absorbing materials. These contain a matrix with a fixed X-ray absorbing filler or in the form of gold tubes. U.S. Pat. No. 3,194,239 discloses an X-ray absorbing material in the form of a wire consisting of alloys that contain silver, bismuth, tantalum, wherein the wire and the matrix are fastened together by interweaving and forming a kind of textile thread. Materials containing a matrix with a fixed X-ray absorbing filler of wire made of silver-, bismuth-, tantalum-containing alloys where the wire and matrix are fastened together by interweaving and form a textile thread are preferable to the materials disclosed in U.S. Pat. No. 2,153, 889, with regard to their solidity, but have a lower plasticity. This lower plasticity is inadmissible in many cases.

Also known are materials that protect from the impact of X-ray and gamma radiation with heavy fillers, the most widespread of which is lead (See "Technical headway in atomic engineering." In *Isotopes in the U.S.S.R.*, vol. 1 (72), p. 85). A filler (for example, lead) and a matrix (for example, concrete, polymers, etc.) differ greatly in density, and therefore the filler (lead) is spread irregularly along the matrix volume, which results in a decrease in the X-ray absorbing properties of the material as a whole.

United Kingdom Patent No. 1260342, G 21 F 1/10 discloses an X-ray absorbing material produced on the basis of a polysterol polymeric matrix and a lead-containing organic filler. This material has the same drawback as the lead-containing fillers described in "Technical headway in atomic engineering." cited above—it also shows an irregular distribution of a heavy X-ray absorbing filler inside the matrix, the material of which has a considerably lower density than the material of the filler.

Closest to the present invention is Russian Federation Patent No. 2053074 G21 F 1/10 of Jun. 27, 1996 (prototype), which discloses an X-ray absorbing material containing a matrix with a fixed X-ray absorbing metal-containing filler in the form of dispersed particles. The drawback of this material is that the addition of a lead-containing filler to a textile base results in a reduction of the density of the material due to the violation of the uniform structure of the textile base that in turn limits the possibility of using the material for the manufacture of various protective articles. A material made on the basis of a thread with lead-containing filler cannot be used as an X-ray contrasting material in the practice of medical radiology due to the lead's toxic properties. Furthermore, it is impossible to effectively and compactly protect against X-ray and gamma-radiation on the basis of such material as a thread (see Russian Federation Patent No. 2063074), and in this case, in order to use the material made from thread it is necessary to apply the special technology of dense, multi-layer machine knitting for the manufacture of multipurpose protective textile tissue. In this way, however, because the narrow bundle of quanta by a stratum of material having a width=X weakens exponentially, in compliance with the described rules set forth in *Methods of radiation granulometry and statistical simulation in research on the structural properties of composite materials* (V. A. Vorobiev, B. E. Golovanov, S. I. Vorobieva; Moscow: Energoatomizdat, 1984), there occurs a reduction in radiation intensity:

$$I = Io\ e^{-\mu x} \quad (1)$$

Where

I is the intensity of radiation that passes through a stratum of material having a width=X, Io is the intensity of the initial radiation, μ is the linear factor of radiation reduction (weakening; the tabular regulated value for each of the X-ray absorbing materials).

Another drawback of this example of the prior art consists of the high percentage of the metal-containing filler in the total amount of the X-ray absorbing material (a percentage of 66%–89%). This causes an increase in the mass of X-ray absorbing material as a whole, and, on the other hand, the articles made out of this material and heavy and inconvenient to maintain. Still a further drawback of this example of the prior art is the irregular distribution of the heavy filler in the matrix volume.

SUMMARY OF THE INVENTION

The main tasks in developing X-ray absorbing (i.e., X-ray contrasting and X-ray protective) materials are:

to eliminate the toxicity of the X-ray contrasting material; and to reduce the mass and width of the protective material.

The elimination of toxicity is achieved by means of the application of non-toxic fillers (tungsten, for example). On the one hand, the creation of a compactness of protection with the width of the protective material reduced at the same time that the degree of X-ray and gamma radiation is reduced leads to an increase in the mass of the material protective layer caused by the use of "heavy" fillers, i.e., fillers of high density. On the other hand, when the X-ray absorbing properties are conserved, the reduction of the density of the protective material makes necessary increasing its width.

This position can be illustrated with an example of an X-ray absorbing material in the form of a protective textile tissue (a radiologist's protective apron, for example) that ensures a level of protection characterized by the reduction factor K=100. It is possible to move from Formula (1) as follows:

$$K = Io/I = e^{\mu x} = 100,$$

from whence it follows that:

$$x = lnK/\mu = 4{,}6/\mu.$$

As an example, compare the properties of tissues made of threads containing known fillers in the form of non-segregated dispersed particles of lead (Pb) and tungsten (W). The size of the tissues compared was set as 10×10 cm. The initial data for comparison are shown below, in Table 1.

TABLE 1

Initial Data for Comparison

| Materials used for the particles of filler – 1 | Linear factor of radiation reduction - (weakening), μ, cm* | Particles' material density ρ g/sm$^3$ |
|---|---|---|
| Pb | 40.3 | 11.34 |
| W | 50.1 | 18.7 |

*NOTE: Radiation source is an X-ray emitting (Roentgen) tube, energy −60 keV.

Using the data shown in Table 1, it is possible to deduce from Formula (2), the values of width X for tissues made of threads with a filler consisting of:

Pb(X=0,11 cm) and W(X=0,09 cm).

Accordingly, the mass of such protective tissues with a volume of 10×10×10 will be:

For Pb—124,74 g, and for W—168,3 g.

If the mass of a protective tissue using Pb is taken as 1, then (according to the equal protective properties and equal sizes) the ratio of the mass of tissues made on the basis of threads containing Pb and W will be 1:1.35.

Thus, it is impossible to obtain the simultaneous reduction of the width of the protective material and its mass using the prior art and known technologies.

According to the present invention, the tasks that must be achieved are solved by means of the strategies set forth in the distinctive part of the independent claims, as discussed below.

DESCRIPTION OF THE PREFERRED EMBODIMENTS

A first embodiment of an X-ray absorbing material comprises a matrix with a fixed X-ray absorbing metal-containing filler. This material uses as a filler a poly-dispersed mixture that is segregated by intermixing. The mixture contains metallic particles having a size of between $10^{-9}$ and $10^{-3}$ m, while the textile base serves as a matrix. As this takes place, the particles are bonded to the surface of the textile base, and the density of the X-ray absorbing material as a whole—with the X-ray absorbing properties of the material being equal to those of the material used to the particles of the X-ray absorbing filler—is defined as follows:

$$\rho_m=(0.01\text{–}0.20)\rho_p,$$

where $\rho_m$ is the density of the X-ray absorbing material as a whole, and $\rho_p$ is the density of the material used for the particles of the X-ray absorbing filler.

In a second embodiment of an X-ray absorbing material comprising a matrix with a fixed X-ray absorbing metal-containing filler in the form of dispersed particles, the material uses as a filler a poly-dispersed mixture that has been segregated by intermixing. This mixture contains metallic particles having a size of between $10^{-9}$ and $10^{-3}$ m, wherein the metallic particles are surrounded by the volume of a matrix made of at least one component that is solidifying under atmospheric pressure or of a matrix made of the composition that forms the base of this component. As this takes place, the total mass of the segregated poly-dispersed mixture of X-ray absorbing particles of filler is defined as follows:

$$M=(0.05\text{–}0.5)\,m,$$

where M is the total mass of segregated poly-dispersed mixture of X-ray absorbing particles of filler, and m is the equivalent mass of the X-ray absorbing filler material equal in protective properties to mass M.

In a third embodiment of an X-ray absorbing materials that is comprised of a matrix with a fixed X-ray absorbing metal-containing filler in the form of dispersed particles, the material uses as a filler a poly-dispersed mixture that has been segregated by intermixing and that contains metal particles having a size of between $10^{-9}$ and $10^{-3}$ m. Here, the particles are bonded to an intermediate substrate surrounded by a volume of matrix made of at least one compound that is solidifying under atmospheric pressure or a matrix of the composition that forms the base of this compound. A textile base serves as an intermediate substrate. A mineral fiber can also be used as an intermediate substrate.

The embodiments set forth above related to a range of inventions that are all interconnected by the inventors' common conception. In this way, this range of inventions consists of a single type and application, one that ensures the same technical result, namely, the elimination of toxicity in an X-ray contrasting material and the reduction of mass and width in a protective material, which are all necessary requirements for the invention that is represented by these embodiments.

The various embodiments of the three presented embodiments of the present invention can be explained in a more detailed way as follows.

In a first embodiment of the X-ray absorbing material, a filler is created in the form of a poly-dispersed mixture that has been segregated by intermixing. The fact that this mixture is comprised of metallic particles having a size of between $10^{-9}$ and $10^{-3}$ m ensures that the X-ray absorbing filler will evidence the filler's qualitatively new feature: an increase in the filtering of interaction between the X-ray and gamma ray emissions and substances. Due to this effect, the material demonstrates a capacity for increased X-ray absorption.

The use of poly-dispersed mixtures as filler is much used in the X-ray absorbing materials described in Russian Federation Patents No. 2063074 and 2029399, where non-segregated particles with a size between $10^{-6}$ and $10^{-3}$ m are used. However, in this invention these particles are used to cause the more regular distribution of the X-ray absorbing filler along the surface of a matrix or inside it.

In the X-ray absorbing metal-containing material defined in the present invention, the poly-dispersed mixture that has been segregated by intermixing ensures not only the more regular distribution of the X-ray absorbing filler along or inside the surface of a matrix but also provides for the evidencing of a qualitatively new effect: an increase in the reduction of the interaction between the X-ray and gamma-ray emissions and substances.

A finely dispersible mixture of metal-containing elements (sized between $10^{-6}$ and $10^{-7}$ m) is used in the known material employed in Soviet Certificate of Invention No. 1826173. This mixture is bonded to the textile base surface. Unlike this material, this present invention uses a poly-dispersed mixture made of particles having a wide range of sizes: the range of $10^{-9}$ and $10^{-3}$ m is used. Thus, particles having sizes within the above mentioned range are included within the common mixture. Consequently, there seem to be no technological obstacles to working with such a mixture under standard, natural conditions, i.e., the mixture does not demonstrate physical and chemical activity. In particular, this mixture does not manifest pyrophoric/combustible properties.

In the present invention, the use of a poly-dispersed mixture that has been segregated by intermixing and having sizes in the range of $10^{-9}$ and $10^{-3}$ m provides for a qualitatively new effect, if compared with the analogous material used in Soviet Invention No. 1826173. This effects consists in obtaining the same abnormal X-ray absorbing properties.

The dispersed particles of the analogous material of Certificate of Invention No. 1826173 are bonded to the thread surface, i.e., to the surface of a textile base. In contrast, in the present invention not only threads but also separate filaments of a thread can be used as a textile base—i.e., the notion "textile base" includes not only thread but also separate filaments. The present invention shows separate filaments to be coated by an X-ray absorbing filler. Furthermore, these filaments do so in the form of a poly-dispersed mixture that has been segregated by intermixing and that contains poly-dispersed particles self-organized into energetically interconnected power-consuming groups. Provided that the filaments twist into a thread, that thread shall have qualitatively new and higher specific X-ray absorbing properties in comparison with the material in the Soviet Certificate of Invention No. 1826173.

Therefore, the use of a textile base as a matrix, where the X-ray absorbing, metal-containing segregated particles of filler are to the surface thereof, ensures a qualitatively new effect, one that differs markedly from the prior art and is manifested in the higher X-ray absorbing properties of the material, which is characterized by extreme heightened specific properties of X-ray absorption.

In Soviet Certificate of Invention No. 1826173, an X-ray absorbing coating of a thread-matrix surface is provided. The X-ray absorbing material offered by the present invention the matrix can be formed by not only a textile base in the form of whole thread, but also a textile base in the form of the separate filaments of which the thread consists (as mentioned above). A thread made and twisted from separate filaments each coated with an X-ray absorbing filler displays much greater X-ray absorbing properties than a thread where only the open surface thereof is so coated. In the present invention, a filament included in the thread is coated with an X-ray absorbing filler. Moreover, the surface of each filament is covered by dispersed particles that have been segregated by intermixing. As a result, the dispersed particles are self-organized into the energetically interconnected X-ray absorbing groups and this, in turn, causes the extreme increase in the specific characteristics of the X-ray absorbing process.

The embodiment of the X-ray absorbing material as a whole, with simultaneous X-ray absorbing properties for this material and for the filler material, can be seen in the following way. If the density of the filler is defined by the relation:

$$\rho_m=(0{,}01\text{–}0{,}20)\rho_p,$$

where $\rho_m$ is the density of the X-ray absorbing material as a whole; and $\rho_p$ is the density of the material used to the particles of the X-ray absorbing filler, then a qualitatively new effect (when compared with the prior art materials) is created, namely, the simultaneous reduction of the width and the density of a protective material, which, in turn, makes it possible to overcome the main contradiction inherent in the process of creating compact protection against X-ray and gamma-radiation. According to the present invention, the densities of the protective materials within a thread and tissues, depending on technical conditions, can constitute between 0.01 (upper limit) and 0.2 (lower limit) of the material density of the X-ray absorbing filler particles. If the mass of X-ray absorbing material (in the present embodiment, a protective tissue made from a thread, according to the present invention) is taken to be 1, then if the protective properties and the sizes of the conventional protective tissue to be compared is equal to those of the tissue based on the thread of the present invention, and under the conditions set forth in Table 1, the correlation by mass will be defined as in Table 2, below.

TABLE 2

Comparative correlation of tissues by mass at equal protection properties (with regard to the data set forth in Table 1)

| Relative limits of oscillation of correlation between the density of tissue made of the material of the present invention and the density of the material used for the particles of the X-ray absorbing filler | Tissue made of the material of the present invention | Tissue made of threads with a filler in the form of non-segregated particles of Pb | Tissue made of threads with a filler in the form of non-segregated particles of W |
|---|---|---|---|
| Upper limit (0.01) | 1 | 198 | 267 |
| Lower limit (0.2) | 1 | 9.9 | 13.35 |

Thus the X-ray absorbing material (tissue) of the present invention would have a mass between 9.9 and 267 times (all other physical and chemical parameters being equal) when compared with the protective tissues based on threads with a filler of non-segregated particles of Pb and W. This factor ensures a qualitatively new effect.

In consequence, when compared with the prior art, the X-ray absorbing material of the present invention demonstrates the absolute absence of toxicity, ensures a great deal of solidity equal to the solidity of the X-ray absorbing textile base shown above. Furthermore, the present invention ensures abnormally high X-ray absorbing properties with a concomitant low density.

In a second embodiment of X-ray absorbing material, the use of poly-dispersed mixture segregated by intermixing, one comprised of metallic particles having a size between $10^{-9}$ and $10^{-3}$ m (as in the embodiment set forth above), ensures the manifestation of a qualitatively new effect in cutting down the interaction between X-ray and gamma-ray emissions and substances.

First, the poly-dispersed mixture with metallic particles sized between $10^{-9}$ and $10^{-3}$ m are placed inside a matrix volume, where the matrix is composed of either at least one component that solidifies under atmospheric pressure or a composition formed on the basis of that component. The energetic X-ray absorbing groups formed by intermixing and creating a segregated poly-dispersed mixture should not be violated in any way. This promotes the self-organization of the energetic X-ray absorbing groups.

An inorganic glue can be used as a matrix. Suggested glues include: Na silicate and K silicate water solute, or water suspension of compositions containing oxides of alkaline metals and earth metals, as well as compositions made on the basis of such glues.

The natural polymers can also be used as a matrix. These include: collagen, albumin, casein, gum, wood pitch, starch, dextrin, latex, natural caoutchouc, gutta-percha, zein, soy casein, as well as compositions made on the basis of such polymers.

Synthetic polymers, such as polyakrylates, polyamides, polyethylenes, polyethers, polyurethanes, synthetic rubber, phenolformaldehyde, resin, carbomid resins, calibration epoxy and compositions based on such polymers can also be used as matrices.

Element-organic polymers—including silicon-organic polymers, boron-organic polymers, metal organic polymers and compositions based on such polymers—can also be used as matrices.

Plastics filled with gas, such as foam plastic and expanded plastic, can be used as matrices.

Vegetable oils or drying oils can be used as matrices.

Solutions of film-generating substances, such as oily, alkyd, ether-cellulose lacquers, can be used as matrices.

Concrete, gypsum and so on can be used as matrices.

The present invention as defined herein, uses a matrix made of a compound that solidifies under atmospheric pressure, i.e., under natural conditions. In contrast, in the material in the prior art of the Russian Federation patent No. 2063074, the matrix solidifies under a pressure of 150 mPa. In the present invention the mixture does not need to undergo pressure as do the protective rubbers described in Russian Federation Patent Nos. 2077745, 2066491 and 2069904, which all underwent vulcanization under pressure after the preparation of the mixture. The avoidance of high-pressure treatments helps to avoid the destruction of the energetic X-ray absorbing groups that are formed in the course of intermixing X-ray absorbing element particles in a segregated poly-dispersed mixture. The present invention distinguishes itself in the same way from Soviet Certificate of Invention No. 834772, as according to that Certificate, the X-ray absorbing material is obtained under a pressure of 150–200 kg/$cm^2$.

In a similar material in U.S. Pat. No. 3,194,239, the pressed pills of previously crumbled-up iron-manganese (IMC) are used as an X-ray absorbing filler, which differs from the present invention. The effect of pressure on the filler used in Russian Federal Patent No. 20293399 also makes it impossible for the energetic groups to self-organize, as they do in the present invention. Thus, the present invention, having a matrix of at least one compound that solidifies under atmospheric pressure, or of compositions based on this compound, displays essential differences from the material used in the prior art as defined in Russian Federation Patent No. 2063074.7, and from the similar material found in Russian Federation patent Nos. 2029399, 2077745. 2066491 and 2069904, with respect to their particular functional properties.

Let us assume a condition, in which the common mass of the segregated poly-dispersed mixture consists of the material formed of X-ray absorbing filler particles. Define this condition by the relation:

$$M=(0.05\text{–}0.5)\ m,$$

where M is the total mass of segregated poly-dispersed mixture consisting of the X-ray absorbing particles of filler; and m is the equivalent mass of the X-ray absorbing filler material, which is equal in protective properties of mass M.

This condition will allow (according to the second embodiment of the X-ray absorbing material) the reduction of the mass of known X-ray absorbing fillers in protective materials by a factor of 2 to 20 times, depending on the particular technology and at a savings in the X-ray and gamma-ray radiation reduction factor.

Reduction of the mass and the width of the protective material can be regarded as the main objective in constructing protection from Roentgen- and gamma-radiation. The fact that compact protection displays a diminished layer thickness leads to an increase in the protective layer mass due to the usage of known heavy fillers. In contrast, saving the Roentgen- and gamma-radiation reduction factor by lowering the density of the material makes necessary increasing the width of protection. This is the main dilemma that arises in attempting to create effective compact protection from Roentgen- and gamma-radiation, as the simultaneously reduction of both width and mass in an X-ray absorbing material practically cannot be achieved with the known fillers used for protection. This dilemma requires a compromise approach in the choice of protective width and mass, also allowing for the cost of such protection.

This problem can be illustrated with an example of a common material used for the purpose of protecting against gamma-radiation, such as concrete. The density of different sorts of the usual Portland concrete, which contains cement as a connecting substance and silicon shingle, gravel, quartz sand and similar mineral fillers, is 2.0–2.4 g/$cm^3$. The linear gamma-radiation reduction factor is 0.11–0.13 $cm^{-1}$ (for energy levels of 1–2 MeV). Protection made of concrete having such a density is quite cumbersome and should have considerable width. Concrete that contains cement as a connecting substance, sand as a filler and galena as an X-ray absorbing filler in a ratio of 1:2:4 has a density of 4,27 g/$cm^3$ and a linear reduction factor 0.26 $cm^{-1}$(for energy levels of 1.25 MeV). With concrete-containing cement as a connecting substance, sand as a filler and lead as an X-ray absorbing filler in a ratio of 1:2:4 and has a density of 5.9 g/$cm^3$ and a linear reduction factor 0.38 $cm^{-1}$ (for energy levels of 1.25 MeV). The protective material made of concrete with a lead filler (leaden fraction) or galena is more compact, but such protective material is much more expensive than the usual concretes.

An X-ray absorbing filler such as the baryta $BaSO_4$ makes possible the resolution of choosing an appropriate width and mass of protective material, while allowing for its cost. However, the appropriate solution in each case can only be found in a clinical setting. The baryte concrete, which contains as fillers sand and gravel, and the baryta as an X-ray absorbing filler, has a density of 3.0–3.6 g/$cm^3$. The linear reduction is thus 0.15–0.17 $cm^{-1}$ (for energy levels of 1.25 MeV). However, the total mass of the baryte concrete protection of set gamma-quantum energy values remains considerable, which causes serious difficulties in creating protective material, especially in the protection of transport facilities.

The above dilemma could be overcome if iron-manganese concretes were to be used as an X-ray absorbing filler, for example, as disclosed in Russian Federation Patent No. 2029399. But even in this case it is impossible to reduce the total mass of the protective material by more than 20–45%, as compared with known and conventional materials.

According to the present invention, however, the correlation that exists between the total mass of segregated poly-dispersed mixture consisting of particles of an X-ray absorbing material and the formula set forth above allows for the reduction of the mass of the known X-ray absorbing fillers included in protective materials up to 2 to 20 times, depending on particular technical conditions and with savings in X-ray and gamma-ray radiation reduction.

The technical outcome of the second embodiment of the invention is that an X-ray absorbing material with a low percentage of a metal-containing X-ray absorbing filler is obtained. This provides for the reduction of the width and mass of the X-ray absorbing material as a whole without the loss of any X-ray absorbing properties.

In a third embodiment of an X-ray absorbing material, the use of a poly-dispersed mixture that has been segregated by intermixing, one comprising metallic particles having a size between $10^{-9}$ and $10^{-3}$ m as a filler (as has been described), makes possible the qualitatively new effect of the X-ray absorbing filler used, namely, a substantial diminishment of the interaction between the X-ray and gamma-ray emissions and substances.

The bonding of a segregated poly-dispersed mixture, of the X-ray absorbing substrate particles to the intermediate substrate, promotes the ability to obtain an X-ray absorbing material with the even distribution of heavy X-ray absorbing metal-containing filler inside the matrix having considerably smaller density that the material of the filler.

The distribution of this poly-dispersed mixture comprised of metallic particles having a size between $10^{-9}$ and $10^{-3}$ m inside the volume of a matrix made of at least one compound that solidifies under atmospheric pressure or made of a composition based on said compound eliminates (as was described above) the possibility that there will be a violation of the energetic X-ray absorbing groups that consist of the poly-dispersed mixture of the X-ray absorbing element particles. This distribution also promotes the self-organizing of energetic X-ray absorbing groups.

A textile base and a mineral fiber can be used as an intermediate substrate according to the third embodiment of the invention.

The above description of embodiments of an X-ray absorbing material confirms the possibility that the invention can be realized in practice, since only resources known at the time of the invention's creation are used. In addition, it is shown above that the totality of components described as the essence of the invention is sufficient for the solution of the task at hand.

The above embodiments of the invention can be illustrated with the following examples.

EXAMPLE 1

A filler in the form of a poly-dispersed mixture segregated by intermixing, made of tungsten particles, is bonded to a matrix surface made in the form of a twisted lavsan thread. For this purpose, a thread is put for 10 minutes into a pseudo-liquefied (boiling; under the effect of a heavy air stream) stratum of a poly-dispersed mixture. This mixture has the following proportional structure: 20 microns—15%; 45 microns—80%; 500 microns—about 5%; 1000 microns—0.01%.

Under these conditions the segregation of particles occurs because of the fact that these particles organize themselves into interdependent powerful X-ray absorbing groups. At the same time, these particles are attracted to the thread and are therefore "welded" to its surface. The thread, thus treated, gains the properties necessary for providing an abnormal reduction of X-ray radiation.

The initial data of the experiment:

Diameter of the thread—0.3 mm;

Length of the thread—3200 mm;

Weight of the thread before determining the level of mechanical impurity from tungsten—0.110 g;

Width of the thread after determining the level of mechanical impurity from tungsten—0.160 g;

Solidity of the thread before determining the level of mechanical impurity from tungsten—47 H, Solidity of the thread after determining the level of mechanical impurity from tungsten—47 H.

Therefore, the mass density of the groups of tungsten particles on the surface of the thread is 0.0017 g/cm$^2$, the size of the thread—0.22 cm$^3$, and the density of the thread, taken as a whole: p=0.7 g/cm$^3$.

After treating the sample of thread with a stream of quanta having an energy level of 60 keV and after fixing the outcomes on Roentgen film, a measuring of densities between the standard leaden plates of differing widths (a gradual weakening from 0.5 mm Pb up to 0.5 with 0.05 Pb) is performed. As a result, it is ascertained that the X-ray absorption level of the thread is equivalent to a leaden plate having a width of 0.1 or 0.075 mm W. Accordingly, this testifies to the abnormally high X-ray absorbing properties of the thread.

Furthermore, according to the claims of the invention $$\rho_m=(0.01\text{–}0.20)\ \rho_p,$$

where $\rho_m$ is the density of the X-ray absorbing material (in this case, a thread) as a whole, and $\rho_P$ is the density of the X-ray absorbing filler material (in this case, tungsten), we have:

$$\rho_m/\rho_p=0.7/19.3=0.036.$$

The value obtained for the ratio $\rho_m/\rho_p$ is within the range of 0.01–0.2, which is consistent with the claims of the invention.

EXAMPLE 2

The segregated poly-dispersed particles of tungsten having a size between $10^{-9}$ and $10^{-3}$ m are bonded to a matrix in the form of a textile material (a thick woolen cloth such as that used for an overcoat having a width of 0,4 cm. The segregation and bonding of the tungsten particles to the textile matrix occurs due to precipitation due to the presence of hydrosol under conditions of continuous intermixing for at least the last 15 minutes. Then a sample is dessicated at room temperature for one day. The subsequent X-ray testing (at quantum energy levels of 60 keV) shows that the X-ray protection properties of the sample obtained correspond to the properties of a lead slice having a width of 0.015 cm. This level of protection testifies to the abnormally high reduction of the X-ray emission stream, since the level of protection in the use of a usual non-segregated filler particle material requires the bonding to a matrix at the level of 100% of the tungsten by mass (instead of the 53% in the present example). Indeed, in the invention according to the present example the mass of the X-ray absorbing filler is 0.116 g, i.e., 53% of the total mass of the sample, where the width of a sample made of a textile material (the thick woolen cloth of an overcoat) is equal to 0.4 cm and the size of the sample is 1×1 cm$^2$ and the mass thereof is 0.216 g. Simultaneously, the density of the X-ray absorbing material as a whole is:

$$\rho_m=0.216/1\times1\times0.4=0.54\ \text{g/cm}^3,$$

and the mass of tungsten in the non-segregated particles is equivalent in its X-ray absorbing properties to:

$$0.015\times0.75\times19.3=0.217\ \text{g},$$

i.e., 100% of the mass of the sample of textile material.

It is obvious from this that the relation $\rho_m/\rho_p=0.54/19.3=0.0279$ corresponds to the appropriate stated range.

EXAMPLE 3

An X-ray absorbing filler in the form of poly-dispersed particles of tungsten having a size between $10^{-9}$ and $10^{-3}$ m, the amount=12% of the mass, is introduced into a filler in the form of rubber of the brand "Ap-24" having the following structure: C—84.73%; H—9.12%; 5—1.63%; N—0.58%; Zn—2.27%; $O_2$—1.69% and a size of 100 cm$^3$. The tungsten particles included in the structure of crude rubber undergo segregation by intermixing in a mixer over the course of 8 hours. As a result, the particles organize themselves into X-ray consuming groups.

After that the crude rubber, filled with the X-ray absorbing filler, undergoes vulcanization without being put under pressure. Subsequent testing (at energy levels of quanta of 60 keV) shows that the X-ray protection properties of the sample of rubber, which has a width of 3 mm, correspond to the properties of a lead slice having a width of 0.11 mm. This level of protection testifies to the abnormally high reduction in the X-ray emission stream, since the level of protection in the use of non-segregated filler particle material requires adding 0.16 g of tungsten to the matrix, i.e., 34% by mass (instead of 12%, as in this case).

Thus, for the example:

width of a rubber sample—&=0.3 cm;

density—p=1.56 g/cm$^3$;

a mass of rubber with a size 1×1 cm having 0.468 g; and the total mass of the filler of poly-dispersed particles, i.e., 12% of the mass of rubber M=0.056 g, an equivalent mass of X-ray absorbing filler equal in protective properties to the mass M, is equal to m=0.16 g (34% of the total mass of the rubber sample).

It is obvious from this that the relation M/m=0.056/0.16=0.35 is well within the range defined in the claims (0.05–0.5). Thus, the amount of filler waste is diminished, the mass of the protection material as a whole is reduced, and production costs are diminished.

EXAMPLE 4

A filler of super-thin basalt fiber TK-4, on which a poly-dispersed mixture that has been segregated by intermixing (in a spherical porcelain attritor) and that is made of tungsten particles having a size between $10^{-9}$ and $10^{-3}$ m is fixed, is introduced into a matrix of epoxy priming of the "AP-0010" (Russian Federation Official Standard No. 28379-89). The relation of basalt fiber mass to the mass of tungsten is 1:3. The proxy priming mixture has been carefully mixed, using a palette knife, with a prepared basalt fiber so that the relation of the mass of priming mixture to the mass of fiber is 1:9. After mixing and obtaining a homogeneous mass, the priming mixture is spread over a surface of cardboard plates in an even stratum. After solidifying for one day, the mixture is tested. The X-ray testing of samples (at energy levels of quanta=60 keV) shows that at a priming layer depth equal to 2.06 mm, the X-ray protective properties are equal to 0.08 mm Pb. This testifies to an abnormally high reduction of the X-ray emission stream, since the usual level of protection for the use of non-segregated weighing material particles requires adding to the epoxy matrix 38% of tungsten by mass (instead of 7.5%, as in this case).

Consider the example &=2.06 mm, p=1.46 g/cm 3, the mass of an epoxy priming mixture having the size 1×1 cm 2 is 0.3 g. The total mass of an intermediate substrate with tungsten particles bonded to the substrate is 0.03 g (10% of the mixture's mass). Thus, the mass of the tungsten makes up three-quarters of the mass of the filler, i.e., 0.0225 g, which constitutes 7.5% of the mass of the mixture as a whole. Furthermore, the mass of tungsten, which is equal to the mass of lead having a width of 0.08 mm, is 0.008×0.75×19.3=0.1158 g, which corresponds to 38.6% of the mass of the mixture.

EXAMPLE 5

Five percent of the mass of an intermediate substrate in the form of crumbled staple fibers (byproducts of fulling and worsted industries) has had poly-dispersed particles of tungsten having a size between $10^{-9}$ and $10^{-3}$ m and having been segregated for 20 minutes by intensive mixing in a pseudo-liquefied layer bonded to it. This five percent is then introduced into a matrix of dry gypsum. The relation of the mass of staple fibers to the mass of tungsten is 1:3. This mixture is carefully mixed to obtain a homogeneous gypsum-filamentary mass. Water is then added and the mixture is carefully mixed again. Samples having a size 1×1 cm and a width of 1 cm are cast. After drying and solidifying, the samples undergo testing (at energy levels of quanta=60 keV). X-ray testing with subsequent matching with gradated lead weakener shows that the samples obtained have protective properties equal to those of a lead plate with a width of 0.04 cm. This level of protection testifies to the abnormally high reduction of X-ray radiation, since the same level of protection can be attained with the use of non-segregated particles of filler only with a content of tungsten particles of 26.32% of the mass (instead of 3.75, as in the present case). In the example of the width of a gypsum sample=1 cm, its density=1.32 g/cm$^3$, the mass of the mixture is 1.32 g. Thus, the share of the mass of tungsten particles in the mixture is:

$$1.32\times0.05\times0.75=0.0495 \text{ g},$$

i.e., 3.75% of the total mass of the mixture. The mass of tungsten equal to the mass of a lead plate having a width of 0.04 cm (using the results of X-ray testing) is equal to $$0.04\times0.75\times19.3=0.347 \text{ g},$$

which corresponds to 26.32% of the mixture's mass.

The above-stated examples of particular embodiments of X-ray absorbing materials and the ways of achieving these embodiments testify to the industrial applicability of these materials in various areas of engineering.

The invention claimed is:

1. An X-ray absorbing material comprising:

a matrix with a fixed X-ray absorbing metal-containing filler in the form of dispersed particles, wherein said filler material is a poly-dispersed mixture that has been segregated by intermixing and that contains metallic particles having a size between $10^{-9}$ and $10^{-3}$ m fixed in a textile base that serves as a matrix; and wherein the particles are bonded to the surface of and embedded in said textile base, and where the density of the X-ray absorbing material as a whole, given that the X-ray absorbing properties are equal to those of the material used for the particles of the X-ray absorbing filler, is defined by the relation:

$$\rho m=(0.01\text{–}0.20)\rho p,$$

where ρm is the density of the X-ray absorbing material as a whole, and

ρp is the density of the material used for the particles of the X-ray absorbing filler.

2. An X-ray absorbing material comprising:

a matrix with a fixed X-ray absorbing metal-containing filler in the form of dispersed particles, where said filler material is a poly-dispersed mixture that has been segregated by intermixing and that contains metallic particles having a size between $10^{-9}$ and $10^{-3}$ m, wherein said particles are surrounded by the volume of a matrix that is made of at least one compound that solidifies under atmospheric pressure, or made of a composition derived from a base of the same compound, and the total mass of the segregated, poly-dispersed mixture consisting of particles of the X-ray absorbing filler is defined by the relation:

$$M=(0.05\text{–}0.5)\ m,$$

where M is the total mass of the segregated poly-dispersed mixture consisting of the X-ray absorbing filler particles, and m is the equivalent mass of the X-ray absorbing filler material equal in protective properties to mass M.

3. An X-ray absorbing material comprising:

a matrix with a fixed X-ray absorbing metal-containing filler in the form of dispersed particles, where said filler material is a poly-dispersed mixture containing metallic particles having a size between $10^{-9}$ and $10^{-3}$ m, wherein said particles are bonded to an intermediate substrate surrounded by the volume of the matrix formed of at least one compound that solidifies under pressure.

4. An X-ray absorbing material, as defined in claim 3, wherein:

a textile base is used as an intermediate substrate.

5. An X-ray absorbing material, comprising:

a matrix with a fixed X-ray absorbing metal-containing filler in the form of dispersed particles, where said filler material is a poly-dispersed mixture containing metallic particles having a size between $10^{-9}$ and $10^{-3}$ m, wherein said particles are bonded to an intermediate substrate surrounded by the volume of the matrix formed of at least one compound that solidifies under pressure; and a mineral fiber is used as said intermediate substrate.

6. An X-ray absorbing material comprising:

a matrix with a fixed X-ray absorbing metal-containing filler in the form of dispersed particles, where said filler material is a poly-dispersed mixture containing metallic particles having a size between $10^{-9}$ and $10^{-3}$ m, wherein said particles are bonded to an intermediate substrate surrounded by the volume of the matrix formed of a composition derived from at least one compound that solidifies under pressure.

* * * * *